INVENTORS
Katsuya Inouye
Naoe Hirai
Masahiro Fujii

United States Patent Office 3,413,158
Patented Nov. 26, 1968

3,413,158
WATER-DISPERSED COATING COMPOSITIONS
Katsuya Inouye, Tokyo, Naoe Hirai, Kawasaki, and Masahiro Fujii, Tokyo, Japan, assignors to Yawata Iron & Steel Co., Ltd., Tokyo, Japan
Filed Feb. 11, 1965, Ser. No. 431,923
Claims priority, application Japan, Feb. 13, 1964, 39/7,531
15 Claims. (Cl. 148—6.2)

ABSTRACT OF THE DISCLOSURE

A water-dispersed coating composition having excellent paint characteristics and stability comprises copolymer emulsion containing monovinyl aromatic hydrocarbon, $\alpha,\beta$-olefinic unsaturated carboxylic ester, $\alpha,\beta$-olefinic unsaturated carboxylic acid (the proportion of the olefinic unsaturated carboxylic acid being 6 to 20 parts by weight per 100 parts of resinous components in said emulsion) and a small amount of chromium compound to form cross-linking structure of carboxyl group and chromium compound in the coating in a very short time at baking temperature.

---

This invention relates to a water-dispersed coating composition suitable for coating metal surfaces.

An object of this invention is to provide a novel water-dispersed coating composition which can be handled very easily, preserved stably, and used for coating various kinds of metal.

Another object of this invention is to provide economically articles having improved properties, in particular, excellent corrosion resistance, workability, adhesive property of the coating composition to metal surface, surface hardness, weathering durability, etc. by applying the above-mentioned water-dispersed coating composition on the surfaces of various metals such as metallic sheets and curing (baking) thus coated composition for a short time at high temperatures, which makes it possible to carry out the coating process continuously at a high speed.

Figure 1:
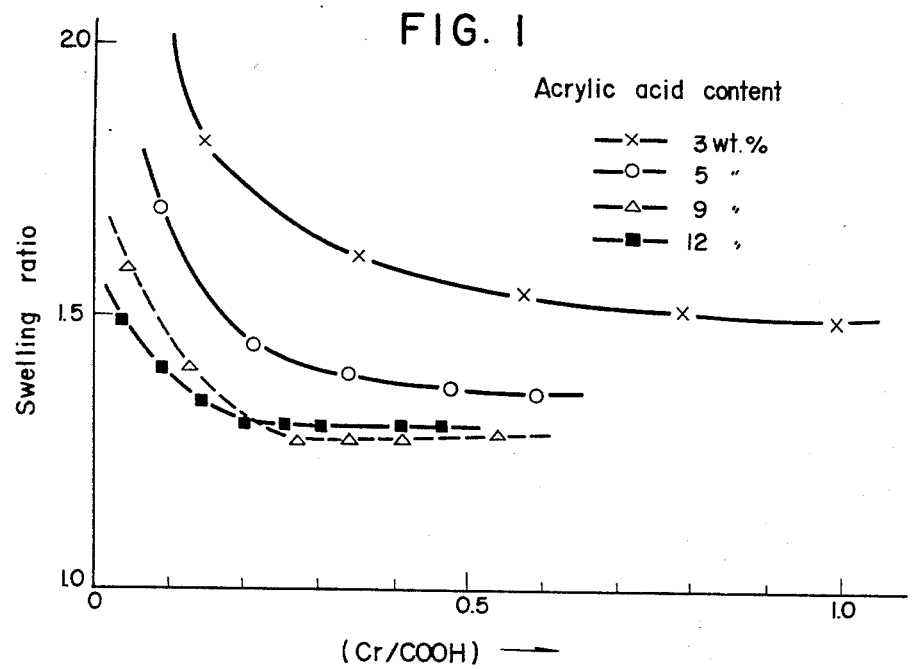
Figure 2:
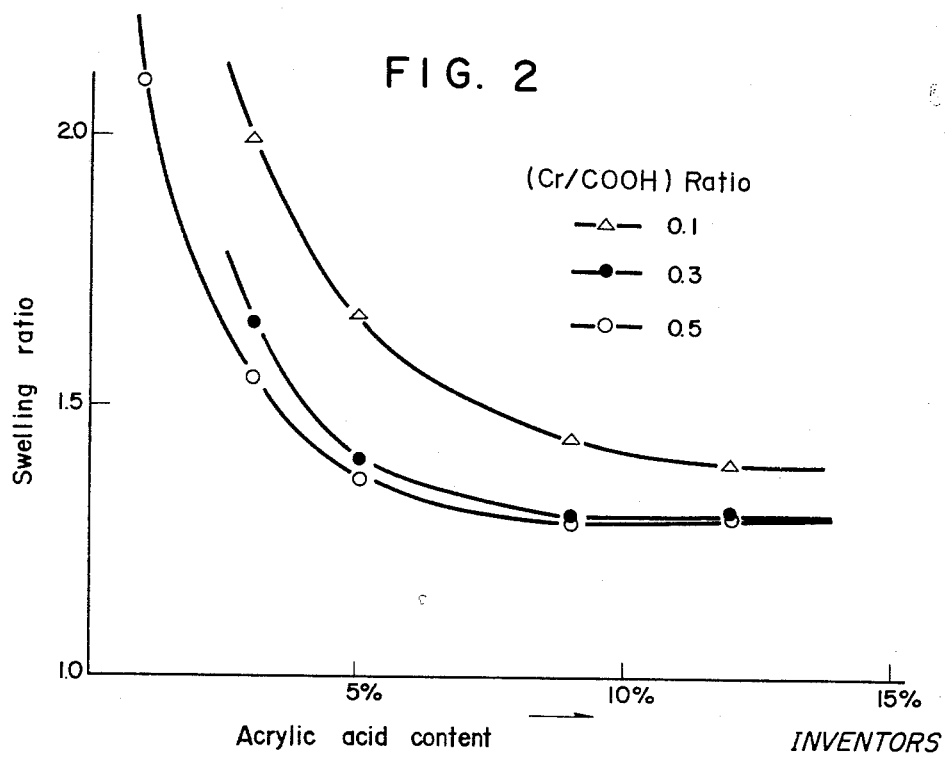

In the accompanying drawings,

FIG. 1 is a graph showing the relation between swelling ratio and Cr/COOH ratio at various acrylic acid contents and FIG. 2 is a graph showing the relation between swelling ratio and acrylic acid content at various Cr/COOH ratios.

As well known, a water-dispersed coating composition prepared by adding suitable pigments to an emulsion of a polymer, such as polyvinyl chloride and polyvinyl acetate is inexpensive and non-inflammable, but since it is inferior to solven-type coatings in weathering durability, chemical resistance, water resistance, humidity resistance, adhesion to metal, and the like, such a water-dispersed coating composition has been used for only indoor coating such as for wall coating.

On the other hand, a solvent-type coating composition is, as mentioned above, better than a water-dispersed coating composition in weathering durability, chemical resistance, water resistance, humidity resistance, adhesion to metal, stability for preservation, etc., but there are such drawbacks in such solvent-type coating composition that the use of such coating composition involves the danger of contaminating surrounding atmosphere with and of flammability of the vapor of solvent from the coating, that the procedure for changing the color of coating is very difficult since it is insoluble in water, and that solvents for the coating are expensive, and therefore, the coating composition is not very suitable for continuous coating processes.

There are many patents relating to improvements in water-dispersed coatings for avoiding such drawbacks of such solvent-type coatings. For example, the process for the production of copolymers described in U.S. Patent 3,057,812 teaches one of such improvements. In the patent, a copolymer of a mono-vinyl aromatic hydrocarbon, acrylic alkyl ester, and $\alpha,\beta$-olefinic unsaturated carboxylic acid are disclosed as the main components of the coating composition and by using such a copolymer, many properties necessary for coatings are considerably improved.

The inventors have studied the problem of improving adhesive property of coating composition to metals, corrosion resistance, and curing characteristics, and investigated coating compositions mainly consisting of copolymers of mono-vinyl aromatic hydrocarbons, acrylic alkyl esters, and $\alpha,\beta$-olefinic unsaturated carboxylic acids. As the results, the inventors have confirmed that the water-dispersed coating composition, wherein chromium trioxide or a chromate is added in the copolymer emulsion in an amount of 0.1–1 part by weight per 100 parts by weight of the emulsion, shows considerably improved corrosion resistance, adhesion to metal, curing characteristics, etc., as compared with conventional aqueous coating compositions.

However, the inventors, still unsatisified, have continued to study for further improvement of adhesive property, corrosion resistance, weathering durability, water resistance, humidity resistance, chemical resistance, and surface property of coating as well as for shortening the curing time. By the results of these studies, the present invention has been attained, by which the above-mentioned purposes are effected.

The water-dispersed metal-coating composition for metals of this invention is a copolymer emulsion containing, as the constituent monomers, a mono-vinyl aromatic hydrocarbon, an $\alpha,\beta$-olefinic unsaturated carboxylic ester, and an $\alpha,\beta$-olefinic unsaturated carboxylic acid, the proportion of said $\alpha,\beta$-olefinic unsaturated carboxylic acid being 6–20 parts by weight to 100 parts by weight of the resinuous components in the emulsion, and said emulsion further containing at least one chromium compound selected from chromium trioxide, a water-soluble chromate, and a water-soluble bichromate in such proportion that the emulsion contains 0.05–0.5 chromium atom per one carboxyl group of the $\alpha,\beta$-olefinic unsaturated carboxylic acid.

Hitherto, there have been many disclosures of the use of copolymers consisting of various vinyl monomers and $\alpha,\beta$-olefinic unsaturated carboxylic acids as solvent-type or water-dispersed type surface-coating materials. In these cases, the combination of the various vinyl monomers are suitably selected to endow preferable properties desired for the coating purpose, that is, favorable corrosion resistance, adhesive property, workability, surface hardness, gloss, wear resistance, chemical resistance, weathering durability, humidity resistance, and the like, while the α,β-olefinic unsaturated carboxylic acids are added as components very effective for adhesion of coating to metal on account of the polarity of the acids. However, the α,β-olefinic unsaturated carboxylic acids have, though they make a contribution to the adhesion of coating as mentioned above, such drawbacks that they reduce the humidity resistance, water resistance, and alkali resistance of the coating owing to the hydrophilic property of the unsaturated carboxylic acids. Therefore, the unsable range of the α,β-olefinic unsaturated carboxylic acids has hitherto been limited to one less than 5 parts by weight (to 100 parts by weight of resinous components) or less than at most 10 parts by weight, even when the unsaturated carboxylic acids are added in order to increase adhesive property of the coating.

Further, there is a process wherein α,β-olefinic unsaturated carboxylic acids are used as reactive groups for cross-linking in order to improve the coating properties as a whole. As for the crosslinking agents in this process, organic compounds having reactive functional groups, such as polyamine compounds, epoxy compounds, polyhydric alcohols are usually used, but in the case where the composition is a solvent type, it is feared that the crosslinking agent may gradually cause reaction during storage to make the coating compositions coagulate and in the case where a crosslinking agent having a sufficient stability for storage is used, it takes a long time for the coating to completely harden by crosslinking.

As a means for preventing the reduction of stability for storage by the addition of crosslinking agents, there is provided a process wherein the copolymers are used as a water-dispersed type and the crosslinking agents as a water-soluble type. In the process, the copolymers and the crosslinking agents are not reacted at room temperature since they are in different phases and the crosslinking agents are diffused into the copolymer particles in the stage of curing, whereby the copolymers are crosslinked. However, in such a case, it takes also a considerably long time to achieve preferable crosslinking by diffusion of the organic crosslinking agents into the copolymer particles, e.g., it required over 30 minutes of curing (cf. U.S.P. 3,057,812). Furthermore, in spite of such a long time of curing, various properties, such as corrosion resistance, weathering durability, water resistance, humidity resistance, alkali resistance, etc., are insufficient for metal coating compositions.

On the other hand, there are many applications involving the reaction of chromium compounds such as chromium trioxide and carboxylic acids, but in the case of adding chromium trioxide, etc., into a solution of copolymers containing α,β-olefinic unsaturated carboxylic acids, the concentration of the solution of copolymers is usually reduced to less than about 10%, since the said copolymers are gradually caused to react with the chromium compound existing in the similar phase, resulting in reducing the stability and sometimes making the composition unsuitable or unusable as coating compositions. Therefore, the thickness of coating film by single coating from such a solution is at most 3 microns and hence such a composition can be used for only primer type uses (cf. U.S.P. 2,902,390).

If a chromium compound such as chromium trioxide is added into a water-dispersed emulsion of copolymers containing no carboxyl groups, for example, into a styrene-butadiene copolymer emulsion of the type disclosed in U.S.P. 3,053,702, the preserving stability of the emulsion is excellent since there are no functional groups crosslinking with the chromium compound in the vehicle, but the emulsion is inferior in other various properties, such as corrosion resistance, chemical resistance, solvent resistance, contamination resistance, heat resistance, etc., since there are no crosslinked structures in the coating obtained by curing the coated emulsion.

Therefore, according to the present invention, an aqueous emulsion, in which copolymers, containing α,β-olefinic unsaturated carboxylic acids, are in the form of minute solid particles dispersed in water, is used and one or more chromium compounds, such as chromium trioxide, are added into the emulsion. Thus, when the composition is cured by heating on the surface of a metal, the copolymer particles are softened and the chromium compounds are easily diffused into the copolymer particles to cause the reaction of the carboxyl groups contained in the copolymers and the chromium compounds, such as chromium trioxide, to form crosslinking structures in the coating. Hence, by the action of the crosslinking structure as mentioned above and other preferable action of the chromium compounds, a water-dispersed metal-coating composition having extremely excellent corrosion resistance, weathering durability, water resistance, chemical resistance, humidity resistance, solvent resistance, contamination resistance, workability, adhesive property, and the like, can be obtained. Moreover, the diffusion rate of the chromium compounds into the copolymer particles in the curing stage is higher than in the case of using organic crosslinking agents, the formation of crosslinking between molecules advances quickly, and then curing of the coating can be finished in an extremely short time such as from 30 seconds to 15 minutes; it makes it possible to perform continuous high-speed coating for metallic materials particularly aluminum, zinc, tin, copper, iron or stainless steel. Besides, since chromium compounds can hardly diffuse into the copolymer particles of the emulsion at temperatures lower than the glass transition point of the copolymers, the composition has a prolonged storage stability.

The crosslinking action of the chromium compounds in the copolymer emulsion have been confirmed also by the following experiments. Copolymer emulsions of styrene and acrylic acid having various acrylic acid contents are prepared and various proportions of chromium trioxide are added into the emulsions. These emulsion compositions are applied on polyester sheets and cured by heating in a similar way as in coating on metals; thereafter the cured copolymer films are separated from the polyester sheets. The films are then immersed in benzene which is a good solvent for the copolymers and the swelling of the films is observed at 30° C.

In general, it has been known that if a linear polymer has crosslinking bonds between the molecules, the linear polymer becomes insoluble in a solvent which is originally a good solvent for the linear polymer and the swelling ratio of the polymer decreases with the increase of the crosslinking bonds. Investigating FIG. 1 and FIG. 2 showing the above-mentioned experimental results, from the viewpoint of the above fact, the features of this invention will become clear.

That is, FIG. 1 shows the results obtained by measuring the swelling percentage of cured films in benzene, said cured films having been prepared by applying copolymer emulsions containing various proportions of acrylic acids on polyester sheets, curing for 3 minutes at 180° C., and then separating from the polyester sheets. The results show that the swelling percentage decreases with the increase of the Cr content down to a constant value at a definite Cr/COOH ratio. The Cr/COOH ratio when the variation of swelling percentage ceases varies from 0.2 to 0.5 with the content of acrylic acid in the range of 3 to 12 weight percent. Further, FIG. 2 shows the relation between the contents of acrylic acid and swelling percentage at various Cr/COOH ratios. The swelling percentage decreases with the acrylic acid content to indicate the increase of crosslinking density by addition of acrylic acid. It was also confirmed that the effect of the acid on swelling percentage decreases with the increase of acrylic acid.

On the other hand, the following fact was observed as to the reaction of carboxylic acids and chromium trioxide. Infrared absorption spectra of cured copolymer films, prepared by adding chromium trioxide to binary copolymer emulsions containing various proportions of styrene and acrylic acid, showed that the absorbance of

of acrylic acid, decreased with the increase of the proportion of chromium trioxide. From this fact, occurrence of reaction of acrylic acid and chromium trioxide in the curing stage of the copolymer emulsion is presumed.

Considering from a practical viewpoint of curable coating compositions, $\alpha,\beta$-olefinic unsaturated carboxylic acid is added in this invention not only to improve the adhesive property of coating to metals to an extent far better than that of conventional coating compositions, but to make possible the formation of crosslinking with the chromium compounds for markedly improving the various properties of coatings. If the content of the carboxylic acids is too low, these effects are not sufficiently realized. Therefore, considering these points from experimental knowledge, the content of the $\alpha,\beta$-olefinic unsaturated carboxylic acid is defined to be more than 6 parts by weight. On the other hand, the stability of copolymer emulsions is reduced by the increase of the content of the $\alpha,\beta$-olefinic unsaturated carboxylic acid, and even though stable emulsion may be obtained, it is undesirable as coating materials that they contain more carboxylic acids than necessary because of hydrophilic groups. Therefore, considering these points from experimental knowledge, the content of the carboxylic acid is defined to be less than 20 parts by weight.

Itaconic acid and methacrylic acid are also caused to react with the chromium compounds such as chromium trioxide to form crosslinking structures similarly as acrylic acid.

In particular, by using acrylic acid in an amount of 11 to 15 parts by weight, coating procedure, adhesive property, workability, water resistance, and humidity resistance are remarkably improved.

However, the study on the effective content of an $\alpha,\beta$-olefinic unsaturated carboxylic acid, 6 to 20 parts by weight, to form crosslinking bonds with the chromium compounds disclosed important facts in regard to the minimum requirements in constituent monomers of the copolymer emulsions of this invention, for securing the excellent composite properties of the obtained coating, which contains 6 to 20 parts by weight of the $\alpha,\beta$-olefinic unsaturated carboxylic acid and is sufficiently stable. Most common monomers in usual coating copolymer vehicle to enable copolymerization with the $\alpha,\beta$-olefinic unsaturated carboxylic acid in the concept described above would be mono-vinyl aromatic hydrocarbons. In order to improve the properties as a whole for coatings, such as corrosion resistance, weathering durability, chemical resistance, water resistance, humidity resistance, etc., in the present invention, the crosslinking density in the coating by the crosslinking reaction of carboxyl groups and chromium compounds such as chromium trioxide must be increased. However, in the case of emulsion polymerization reaction of a system consisting of only $\alpha,\beta$-olefinic unsaturated carboxylic acid and mono-vinyl aromatic hydrocarbons by the process of this invention, coagulation may occur during the polymerization reaction, accompanied with increase of the amount of the carboxylic acids, reducing rapidly the stability of the emulsion. By the results of the inventors' experiments, the limit of content of the $\alpha,\beta$-olefinic unsaturated carboxylic acid in which sufficiently stable emulsions are obtained is less than about 6 parts by weight. However, with such an extent of the carboxylic acid content, the properties of coating prepared from the composition by the crosslinking reaction with chromium compounds are still insufficient. Further, by only the afore-mentioned two components the weathering durability and flexibility of coating are insufficient and the workability is also extremely low.

Therefore, in order to improve the above-mentioned various properties of coating by increasing the crosslinking density and at the same time to improve the workability by increasing flexibility of coating, another component is necessary to be added to the above mentioned two components so as not to disturb the crosslinking reaction of the carboxylic acid and the chromium compound such as chromium trioxide, but at the same time to stably form a copolymer with the above-mentioned two components, said copolymer containing $\alpha,\beta$-olefinic unsaturated carboxylic acid in a sufficient amount necessary for obtaining the required properties as above-mentioned.

As the results of the investigation about compositions satisfying these conditions from the viewpoint explained above, it has been confirmed that combinations of an ester of $\alpha,\beta$-olefinic unsaturated carboxylic acid, a monovinyl aromatic hydrocarbon, and an $\alpha,\beta$-olefinic unsaturated carboxylic acid are most suitable.

It has been found that an $\alpha,\beta$-olefinic unsaturated carboxylic ester cannot form stable copolymer emulsion when reacted directly with an $\alpha,\beta$-olefinic unsaturated carboxylic acid, but if the ester is introduced in the systems consisting of the above-mentioned mono-vinyl aromatic hydrocarbon and the $\alpha,\beta$-olefinic unsaturated carboxylic acid, the stability of the copolymer emulsions are markedly increased and also sufficiently stable copolymer emulsions are obtained even thought the content of the $\alpha,\beta$-olefinic unsaturated carboxylic acid reaches 20 parts by weight relative to the resinous components of this emulsion. From the fact, the significance of the present invention will be easily understood in which combinations of a mono-vinyl aromatic hydrocarbon, an ester of an $\alpha,\beta$-olefinic unsaturated carboxylic acid, and an $\alpha,\beta$-olefinic unsaturated carboxylic acid are used.

Thus, according to the present invention, the content of carboxyl groups in the copolymers can be increased by the addition of the ester of an $\alpha,\beta$-olefinic unsaturated carboxylic acid, and hence the crosslinking density is remarkably increased, resulting in a considerable increase of the above-mentioned properties as well as endowing the excellent properties of the $\alpha,\beta$-olefinic unsaturated carboxylic acid ester, such as adhesive property, workability, weathering durability, and gloss retention.

Therefore, the water-dispersed metal-coating compositions of this invention have particularly improved corrosion resistance, weathering durability, chemical resistance, adhesive property, workability, humidity resistance, water resistance, and the like, as compared with conventional coating compositions for metals.

Since the addition of one or more chromium compounds, such as chromium trioxide, water-soluble chromater, and water-soluble bichromate is, as mentioned above in detail, to form the crosslinking bonds which carboxylic acids, it is reasonable to indicate the amount of the chromium compounds as the ratio to the number of carboxyl groups in the copolymers. By the way, as shown in the experiments about swelling described above, the saturation point of the chromium crosslinking bond is near the point where the Cr/COOH ratio is 0.5. Therefore, chromium compounds in excess of such ratio are unnecessary in regard to the crosslinking bonds, and further, the excess chromium compounds may cause in fact the unstabilization of the emulsions and yellowing of the coating. Hence, the upper limit of the chromium compounds is defined as 0.5 in the Cr/COOH ratio. However, considering the problems more in detail, it is unnecessary to combine all the carboxyl groups in order to improve the coating properties by the crosslinking, and further considering the possibility of chromium atom combining with more than two carboxyl groups, the amount of the chromium compounds needed for the crosslinking in practice may be fairly less than the above-mentioned upper limit of 0.5. The preferable amount should be practically decided in accordance with manifold investigation, in regard to the kind and content of the $\alpha,\beta$-olefinic unsaturated carboxylic acid, the kind of the chromium compounds, the purpose of using the coating compositions, etc. On the basis of empirical knowledge, the lowest amount necessary for forming effective crosslinking is about 0.05 in the Cr/COOH ratio.

The above considerations are summarized as follows.

The invention relates to a water-dispersed coating composition for metals comprising a copolymer emulsion essentially consisting of, as the monomer constituents, a mono-vinyl aromatic hydrocarbon, an $\alpha,\beta$-olefinic saturated carboxylic ester, and an $\alpha,\beta$-olefinic unsaturated carboxylic acid, the proportion of said $\alpha,\beta$-olefinic unsaturated carboxylic acid being 6 to 20 parts by weight to 100 parts by weight of the resinous components in the emulsion, and said emulsion further containing one or more chromium compounds selected from the class consisting of chromium trioxide, water-soluble chromates, and water-soluble bichromates in such ratio that the emulsion contains 0.05 to 0.5 chromium atom per one carboxyl group of the $\alpha,\beta$-olefinic unsaturated carboxylic acid.

At the above definition of the content of the chromium compounds such as chromium trioxide, the upper limit of the Cr/COOH ratio is defined as 0.5 based on the experiments of the crosslinking reaction of chromium atom and carboxylic acids. However, considering from the viewpoint of color of coating obtained from the water-dispersed coating composition of this invention, the vehicle itself is preferable as colorless and transparent as possible, and therefore the upper limit of the content of the chromium compounds, by which the crosslinking effect can be sufficiently expected and coloring of the coating vehicle by the chromium compounds can be effectively avoided, is preferably 0.2 in the Cr/COOH ratio.

After applying the water-dispersed coating composition on the surface of a metal, and the like, the coating is cured at above a temperature necessary for sufficiently diffusing the above-mentioned chromium compounds into the resin particles of the emulsion in the curing process, whereby the crosslinking bonds of the carboxyl groups and the chromium atoms are formed.

Following the above conditions, the composition of this invention having a good mechanical stability and good miscibility with pigments, and the like, can be produced at a comparatively low cost. The water-dispersed coating composition of this invention forms excellent coating on the surfaces of steel plates, galvanized steel plates, chemically treated steel plates, aluminum, copper, tin, stainless steel, etc. In particular, in the case of coating on cold-rolled steel sheets, galvanized steel plates, aluminum plates, stainless plates, tinned steel plates, and copper plates, satisfactory results can be obtained with sufficient cleaning of the metal surface prior to direct coating without particular pre-treatments. The coating treatment is performed by applying the water-dispersed composition on the surface of a metal by a suitable method and immediate curing for a short time at a comparatively high temperature. The coating thus obtained has, as mentioned above in detail, many features desired for coated metal articles due to the excellent co-action of the components and gives a beautiful article having in particular excellent corrosion resistance, workability, adhesion of coated film to surface, surface hardness, and gloss.

The water-dispersed coating composition of this invention is produced as a copolymer emulsion by a conventional emulsion polymerization procedure using three constituent monomers; i.e., a mono-vinyl aromatic hydrocarbon, an $\alpha,\beta$-olefinic unsaturated carboxylic ester, and an $\alpha,\beta$-olefinic unsaturated carboxylic acid.

As the mono-vinyl aromatic hydrocarbons of the constituent monomer of the copolymer emulsion, styrene, vinyl toluene, $\beta$-methyl styrene and vinyl naphthalene may be preferably adopted, but among them styrene and vinyl toluene have advantages that the polymerization reaction can be conducted easily and the reaction time can be shortened.

As the $\alpha,\beta$-olefinic unsaturated carboxylic esters there may be adopted alkyl, aryl and glycidyl esters of acrylic acid, methacrylic acid, itaconic acid, crotonic acid, cinnamic acid, maleic acid, fumaric acid, and the like, but among them alkyl esters of arylic acid and methacrylic acid give the results of excellent workability, weathering durability, and gloss retention.

As the $\alpha,\beta$-olefinic unsaturated carboxylic acids there may be used acrylic acid, methacrylic acid, itaconic acid, crotonic acid, cinnamic acid, maleic acid, fumaric acid, and a mixture thereof. Among them, however, arcylic acid is most suitable in coating procedure and costs.

The copolymer emulsion of this invention further contains one or more chromium compounds such as chromium trioxide, water-soluble chromates and water-soluble bichromates in such ratio that the emulsion contains 0.05 to 0.5 chromuim atom per one carboxyl group of the $\alpha,\beta$-olefinic unsaturated carboxylic acid. As the water-soluble chromate there may be used sodium chromate, potassium chromate, ammonium chromate, calcium chromate, magnesium chromate, and the like, and as the water-soluble bichromate there may be used sodium bichromate, potassium bichromate, barium bichromate, and the like.

Besides the three components as constituent monomers mentioned above, $\alpha,\beta$-olefinic unsaturated nitriles or $\alpha,\beta$-olefinic unsaturated carboxylic amides may be added when necessary.

The addition of the $\alpha,\beta$-olefinic unsaturated nitriles endows chemical resistance to the coating and the addition of the $\alpha,\beta$-olefinic unsaturated carboxylic amides endows hardness to the coating. The typical examples of the $\alpha,\beta$-olefinic unsaturated nitriles are acrylonitrile and methacrylonitrile, and those of the $\alpha,\beta$-olefinic unsaturated carboxylic amides are acrylamide and methacrylamide.

Typical embodiments of the process for the production of the water-dispersed coating composition of this invention are shown below together with typical compounding recipes.

The copolymer emulsion may be produced by mixing 120–180 parts by weight of an aqueous solution containing suitable amounts of a surface active agent and a polymerization initiator and 100 parts by weight of a monomer mixture consisting of 50–80 parts by weight of styrene or vinyl toluene, 10–35 parts by weight of acrylic alkyl ester, and 6–20 parts by weight of acrylic acid, and reacting the system with stirring for 3–10 hours at 65–80° C. Then, after adding a suitable amount of a plasticizer such as di-n-butyl phthalate into the emulsion, the pH of the system is adjusted to 9–12 with the addition of aqueous ammonia, and further chromium trioxide, water-soluble chromate, water-soluble bichromate, or a mixture thereof in such ratio that the emulsion contains 0.05–0.5 or preferably 0.05–0.2 chromium atom per one carboxyl group of the acrylic acid is added into the emulsion.

In the present invention, the pH value of the water-dispersed metal-coating composition is very important. In general, a water-dispersed emulsion of a polymer shows excellent stability in an alkaline state. In the case of using chromium trioxide, water-soluble chromate, or water-soluble bichromate as in this invention, the aqueous solution of the chromium compound has an oxidizing power at an acid state, and the aqueous solution of some chromium compounds show considerable acidity. Hence, the direct addition of the chromium compound into the above-mentioned aqueous emulsion of copolymers may cause coagulation of the emulsion, and even if the chromium compound could be added into the emulsion without coagulation, the emulsion may coagulate during storage. Further, by the oxidizing action of the chromium compound, the copolymers and various organic additives may be decomposed by oxidation, and inorganic pigments etc. added in the emulsion may be changed in quailty. However, the stability of the emulsion can be increased by addition of alkaline substances up to an alkaline state, to neutralize the acidity produced by the chromium compound and to supress strong oxidizing power of the chromium compound such as chromium trioxide, whereby the coagulation of emulsion, decomposition of organic materials such as copolymers by oxidation, and change in quality of pigments can be prevented.

Moreover, the following merit is obtained by alkalifying the emulsion. If the water-dispersed coating composition for metals is directly applied on the surface of a metal in an acid state, metal ions are dissolved out to deteriorate the coating, the coating is colored in brown, and the formation of glossy and smooth coating becomes difficult. However, if the emulsion is applied on a metal surface in an alkaline state, good coating can be obtained. Thus, by maintaining the emulsion in an alkaline state, the stability of emulsion, film forming property and the various properties of coating can be improved.

In the case of adding of a highly acid chromium compound such as chromium trioxide into the emulsion, the chromium compound may be added as a 5–20% aqueous solution after adjusting the pH of the emulsion at an alkaline state by using an alkalifying agent, without any coagulation of the emulsion. On the other hand, potassium chromate, sodium chromate, ammonium chromate, potassium bichromate, sodium bichromate, ammonium bichromate, zinc bichromate, etc., can be easily added into the acid emulsion without coagulation, and even if thus added emulsion is preserved in an acid state for a considerable long time, the coagulation of emulsion, the decomposition by oxidation of copolymer and the change in quality of pigments, and the like, do not occur.

As an alkalifying agent for adjusting the pH of the emulsion into an alkaline state, a compound that does not remain in the coating after curing is preferable, and a volatile alkali such as ammonia is most suitable. The most suitable pH range is 9–12. That is, if the pH is lower than 9, the pH may become acid during storage by the evaporation of the alkalifying agent and if the pH is higher than 12, the esters of the copolymer may be hydrolyzed and/or pigments changed in quality.

In order to prepare the stable emulsion in this invention, the following surface active agents may be preferably used; anionic surface active agents, such as sodium alkylnaphthalene sulfonates (e.g., sodium n-butylnaphthalene sulfonate) and/or sodium dialkyl sulfosuccinates (e.g., sodium di-n-octyl sulfosuccinate). The anionic surface active agent may be used alone or together with a nonionic surface active agent such as polyoxyethylene alkylphenyl ethers (e.g., polyoxyethylene nonylphenyl ether).

A suitable plasticizer to be used in this invention may be a dialkyl phthalate type plasticizer, such as di-n-butyl phthalate and di-n-octyl phthalate, but a phosphate type plasticizer or an aliphatic ester type plasticizer may be also used. However, in the case where a comparatively large amount of a monomer which contributes largely to increase the flexibility of coating, such as 2-ethylhexyl acrylate is added into the copolymer of the coating composition of this invention, considerably excellent workability can be endowed to the coating without using such a plasticizer. In addition, various additives, such as pigments for coloring the coating, an age-resistor for improving ultraviolet ray resistance of the coating, and a defoaming agent for preventing the formation of pin holes in the coating, may be added to the water-dispersed metal-coating composition of this invention.

The pigments suitable for the metal-coating composition of this invention are titanium white, rouge, strontium, chromate, phthalocyanine blue, Prussian blue, carbon black and the like. For example, if titanium white is used as the pigment, a suitable amount is 25–40 parts by weight to 100 parts by weight of the copolymer. By the addition of titanium white, the corrosion resistance, weathering durability and chemical resistance of coating can be also improved.

The compounding recipes adopted in the above-mentioned typical process for the production of the composition of this invention will now be explained. The mono-vinyl aromatic hydrocarbon, styrene or vinyl toluene, which is a constituent of the copolymer, is an component to give hardness, gloss, chemical resistance and water resistance, but if the content of the hydrocarbon is above 80 parts by weight, the adhesive property, workability, weathering durability, and organic solvent resistance are reduced. Therefore, in order to provide the above-mentioned good properties to the coating, and to avoid the above-mentioned faults due to the addition of excessive hydrocarbon, the range of 50–80 parts by weight is adopted for the hydrocarbon. Further, the addition of an acrylic alkyl ester endows flexibility to the coating and therefore improves workability, such as bending and high speed forming, as well as increases the proportion of the carboxyl group without reducing the stability of the copolymer emulsion, because higher carboxyl content increases the crosslinking density of coating. In particular, to improve corrosion resistance, weathering durability, chemical resistance, water resistance, and humidity resistance of coating, the proportion of the ester is preferably 10–35 parts by weight. For example, methyl acrylate, ethyl acrylate, isopropyl acrylate, n-butyl acrylate, n-hexyl acrylate, 2-ethylhexyl acrylate, n-octyl acrylate, and n-dodecyl acrylate may be suitably used, and in order to give particularly excellent workability, the acrylic alkyl ester, with 4–12 carbon atom in the alkyl group, is suitable. On the other hand, acrylic acid, which is one of the $\alpha,\beta$-olefinic unsaturated carboxylic acids, is not only a constituent very effective to improve the adhesive property of the coating, but also a crosslinking constituent between the main chains of the copolymers by the reaction with chromium trioxide in the course of curing. Therefore, the addition of acrylic acid of the $\alpha,\beta$-olefinic unsaturated carboxylic acid gives advantages that the corrosion resistance, humidity resistance, organic solvent resistance and heat resistance of the coating can be remarkably improved by newly formed crosslinking with chromium compound, while the adhesive property of the coating to metal surface is maintained. In particular, in order to obtain excellent feasibility of coating procedure and high adhesive property, the most suitable amount of acrylic acid is 11–15 parts by weight.

For conducting surface coating of metals by the water-dispersed coating composition of this invention, the above-mentioned water-dispersed coating composition is applied on the surface of a metal, and thus formed coating is heated for curing above the temperature necessary for the above-mentioned chromium compound to diffuse into the resin particles of the emulsion, whereby the above-mentioned carboxyl group and chromium atom is crosslinked.

That is, by the surface coating of metals of this invention, crosslinking of a high density can be formed by curing without causing deterioration of the coating surface, and rapid crosslinking at 150–280° C. can reduce remarkably the curing time to enable high-speed continuous coating process by means of a curing furnace of reduced dimensions. At the same time, the formation of crosslinking in high density improves largely not only the heat resistance and organic solvent resistance but also the physical properties such as wear resistance of the coating. As the coating composition of this invention is a dispersion in water, oils and fats on the metal surfaces to be coated impede the formation of good coatings, but if the metal surfaces are sufficiently cleaned previously, satisfactory results can be obtained by coating the surface directly with the composition without pre-treatments such as bonderizing, owing to the excellent corrosion resistance and adhesive property of the coating composition. In practical coating, various coating methods, such as roller coating method, brushing, dipping method, etc., may be applied since the viscosity of the composition can be adjusted in a wide range with addition of water.

In the second place, the film forming temperature may be changed in a considerably wide range according to the compounding ratio of the above-mentioned monovinyl aromatic hydrocarbon to other constituents such as the acrylic alkyl ester, and to the amount of the plasticizer to be added in the system, but in order to obtain sufficient crosslinking effect by the reaction of the $\alpha,\beta$-olefinic unsaturated carboxylic acid and the chromium compound such as chromium trioxide, the curing process must be carried out at a comparatively high temperature. Practically, the curing conditions for the metal-coating composition of this invention are greatly influenced by the kind of metals to be coated, the thickness of the metals and the coating, the kind of curing furnace, etc., and to produce coated articles by using conventional metal plates of 0.2–1.0 mm. in thickness, the curing temperature and the heating time are selected from the range of 150–280° C. and 30 seconds to 15 minutes, respectively.

In the case of a conventional water-dispersed coating composition (e.g., U.S. Patent 3,057,812), the curing time of over 30 minutes is necessary and then such a composition can not be used in a high-speed continuous coating for metals. On the other hand, by using the water-dispersed metal-coating composition of this invention, a continuous high-speed coating for sheets of galvanized steel, cold-rolled steel and chemically treated steel is plausible.

The curing in such a short time by use of a water-dispersed coating composition has not been practiced before. That is, by the coating composition of this invention, a mass production by a high-speed continuous coating line can be realized. However, the sufficient properties expected to the coating composition in this invention are fulfilled by curing at lower temperatures, if the curing time is accordingly long.

In the above-defined conditions, coated metal articles having coatings of 3–30 microns in thickness and having the above-stated improved properties can be produced by this invention without further finishing treatments.

Table 1 shows various examples of composition of the water-dispersed copolymers that can be adopted for the water-dispersed metal-coating compositions of this invention, the processes for the production thereof being explained below.

emulsion copolymers containing about 40% solid copolymer.

After removing coagulant, if any, by filtration, 250 parts by weight of the water-dispersed copolymer had added thereto 20 parts by weight of di-n-butyl phthalate, the mixture was shaken for 30 minutes by a shaker, stood for 12 hours, and then the pH of the system was adjusted to 9–10 with 15% aqueous ammonia with stirring. Thus obtained compositions were used in the following examples for coating of metals with addition of chromium compound such as chromium trioxide, together with pigments, etc.

Example 1

Five (5) parts by weight of water was added into 100 parts by weight water-dispersed copolymer emulsion (II) of Table 1 to reduce the viscosity, and 10 parts by weight of an aqueous solution of 10% chromium trioxide incorporated into the mixture with stirring by means of a mixer. The mixture then had added thereto 10 parts by weight of rutile-type titanium oxide and 0.3 part by weight of a blue pigment, Ferrocyan blue, and kneaded for 50 hours by means of a ball mill to afford a blue water-dispersed emulsion coating having good dispersibility for pigments. By applying the product on the cleaned surface of a cold-rolled steel plate by means of an applicator coating machine and immediately curing for 3 minutes at 230° C. in a hot blast type curing furnace, a steel plate having blue, glossy, smooth and hard coating was obtained.

Example 2

Ten (10) parts by weight of water was added into 100 parts by weight of water-dispersed copolymer emulsion (III) of Table 1 to reduce the viscosity, and the mixture had added thereto 10 parts by weight of an aqueous solution of 10% zinc bichromate with stirring by means of a mixer. After standing for 12 hours, the product was applied on a cleaned galvanized steel plate by means of an applicator coating machine and then immediately cured for 3 minutes at 220° C. to give a coated galvanized steel plate having a coating of 15–20 microns in thickness.

Example 3

One hundred (100) parts by weight of water-dispersed copolymer emulsion (IV) of Table 1 had added thereto 5 parts by weight of an aqueous solution of 20% ammonium chromate and the mixture was stirred uniformly. After standing for 12 hours, the product was applied on a cleaned galvanized steel plate by means of an applicator coating machine and immediately cured for 3 minutes at 200° C. to give a coated galvanized steel plate having a coating of 10–15 microns in thickness.

Example 4

One hundred (100) parts by weight of water-dispersed

TABLE 1

[Composition ratio (weight ratio) of water-dispersed copolymers]

|  | I | II | III | IV | V | VI | VII |
|---|---|---|---|---|---|---|---|
| Styrene | 75 | 60 |  |  |  | 50 | 60 |
| Vinyl toluene |  |  | 50 | 60 | 50 |  |  |
| Butyl acrylate | 13 | 20 | 38 | 25 | 25 | 27 | 23 |
| 2-ethylhexyl acrylate |  | 7 |  | 3 |  |  |  |
| Methyl methacrylate |  |  |  |  | 10 | 10 |  |
| Glycidyl methacrylate |  | 2 |  |  |  | 2 | 3 |
| Acrylonitrile |  |  | 1 |  | 2 |  | 2 |
| Acrylamide |  |  |  |  | 2 |  |  |
| Acrylic acid | 12 | 11 | 11 |  |  |  |  |
| Methacrylic acid |  |  |  | 12 |  | 11 | 12 |
| Itaconic acid |  |  |  |  | 11 |  |  |
| Water | 150 | 150 | 150 | 150 | 150 | 150 | 150 |
| Sodium di-n-octyl sulfosuccinate | 1 | 2 | 1.5 | 2 | 2 | 2 | 2 |
| Sodium n-butylnaphthalene sulfonate |  |  | 0.5 |  |  |  |  |
| Polyoxyethylene nonyl phenyl ether | 1 | 2 | 2 | 2 | 2 | 2 | 2 |
| Potassium persulfate | 0.5 | 0.5 | 0.5 | 0.5 | 0.5 | 0.5 | 0.5 |

After the emulsification of the compositions shown in Table 1 in a closed tube, filled with nitrogen at a reduced pressure, the compositions were subjected to polymerization for 3–5 hours at 65–75° C. by means of a rotary-type thermostat-equipped chamber to give water-dispersed copolymer emulsion (V) of Table 1 had added thereto 10 parts by weight of an aqueous solution of 20% ammonium bichromate and the mixture was stirred uniformly. After standing for 12 hours, the product was applied on a cleaned galvanized steel plate by means of an applicator coating machine and immediately cured for 15 minutes at 150° C. to give a coated galvanized steel plate having a coating of 5–15 microns in thickness.

Example 5

To one hundred (100) parts by weight of water-dispersed copolymer emulsion (VI) of Table 1 was added 10 parts by weight of an aqueous solution of 20% chromium trioxide as in Example 4 and after addition of 0.3 part by weight of Ferrocyan blue into the mixture followed by uniform stirring, the system was allowed to stand for 3 days. Thus obtained coating composition was applied on a cleaned aluminum plate by means of an applicator coating machine and immediately cured for 3 minutes at 200° C. to give a coated aluminum plate having a coating of 5–10 microns in thickness.

Example 6

To one hundred (100) parts by weight of water-dispersed copolymer emulsion (VII) of Table 1 was added 10 parts by weight of an aqueous solution of 20% chromium trioxide as in Example 4 and thus obtained coating composition was applied on a cleaned galvanized steel plate followed by curing for 5 minutes at 180° C. to give the coated galvanized steel plate having a coating of 10–15 microns in thickness.

Example 7

To one hundred (100) parts by weight of water-dispersed copolymer emulsion (I) of Table 1 was added 5 parts by weight of an aqueous solution of 10% chromium trioxide and the mixture was stirred uniformly. After standing for 12 hours, the mixture was kneaded for 50 hours with the addition of 13 parts by weight of rutile-type titanium oxide by means of a ball mill to give a white emulsion coating composition having good dispersibility for pigments. The emulsion was applied on galvanized steel plates by means of an applicator coating machine and cured at various curing conditions. The results of the tests of thus obtained coated plates are shown in the following table. The coating thickness was about 25 microns (dried) in each case.

Example 8

The coating composition prepared by the process shown in Example 7 was applied on a galvanized steel plate by means of an applicator coating machine and cured for 2 minutes at 220° C. in a hot-blast thermostat-equipped chamber. The properties of thus obtained coated plate were compared with those of metal plates coated with commercial coating compositions for metal and marketed colored galvanized steel sheets. The results are shown in the following table, wherein the designations are A. Coated galvanized steel plate according to the present invention, B. A galvanized steel plate coated with a thermo-setting acrylic solvent type coating composition (commercially available) and cured for 5 minutes at 220° C., C. A galvanized steel plate coated with a thermo-setting acrylic aqueous solution type coating composition (commercially available) and cured for 5 minutes at 220° C., D. A colored galvanized steel plate (commercially available) prepared by a thermo-setting alkyd resin, and E. A colored galvanized steel plate (commercially available) prepared by the coating composition as in (B).

(The film thickness in A–E is 20–25 microns.)

TABLE 3

[Results of tests of various coated galvanized steel plates]

| Test | Sample | | | | |
|---|---|---|---|---|---|
| | A | B | C | D | E |
| Salt spray test: | | | | | |
| 144 hours | No change | No change | Slight white rust | Fine blister | Slight blister. |
| 240 hours | do | do | Some white rust | Blister with white rust | Blister with white rust. |
| Erichsen cup test (10 m.m. press). | do | do | No change | No change | Almost no change. |
| Salt spray test after workability test (144 hours). | Slight white rust | Partial blister and rust | Considerable white rust | Slight white rust | Partial white rust. |
| Acid resistance (5% $H_2SO_4$: 100 hours). | No change | No change | Discoloring with blister. | Considerable blister | No change. |
| Alkali resistance (Extract of Portland cement: 100 hours). | do | Slight blister | Almost no change | Discoloring | Do. |
| Gloss (60° C.) | 87 | | | 64 | 76. |
| Pencil hardness: | | | | | |
| Room temp | 5H | F | H | 4H | 2H. |
| 100° C | HB | 4B | 2B | 2H | 3B. |

What is claimed is:

1. A water-dispersed coating composition for metals comprising a copolymer emulsion containing, as the constituent monomers, a mono-vinyl aromatic hydrocarbon, an $\alpha,\beta$-olefinic unsaturated carboxylic ester and an $\alpha,\beta$-olefinic unsaturated carboxylic acid, the proportion of said $\alpha,\beta$-olefinic unsaturated carboxylic acid being 6–20 parts by weight per 100 parts by weight of the resinous components in said emulsion, and said emulsion further containing at least one chromium compound selected from the class consisting of chromium trioxide, a water-soluble chromate, and a water-soluble bichromate in such proportion that the emulsion contains 0.05–0.5 chromium atom per one carboxyl group of the $\alpha,\beta$-olefinic unsaturated carboxylic acid.

2. The water-dispersed coating composition for metals

TABLE 2

[Results of tests of coated galvanized steel plates under various curing conditions]

| Temperature of furnace (° C.) | Curing time (min.) | Surface appearance | Corrosion resistance (salt spray test: 240 hours) | Workability and adhesiveness (Erichsen cup test and Du Pont impact test) |
|---|---|---|---|---|
| 200 | 1 | Smooth, glossy | Considerable white rust | Partially peeled. |
| 200 | 3 | do | Slight white rust | No change. |
| 200 | 5 | do | No change | Do. |
| 220 | 1 | do | Considerable white rust | Slightly peeled. |
| 220 | 1.5 | do | Partial white rust | Do. |
| 220 | 2 | do | Almost no change | No change. |
| 250 | 0.5 | do | Considerable white rust | Considerably peeled. |
| 250 | 1 | do | Slight white rust | No change. |
| 250 | 1.5 | do | No change | Do. |
| 280 | 0.5 | No good | Considerable white rust | Considerably peeled. |
| 280 | 1 | do | do | Do. | according to claim 1, wherein said copolymer emulsion is prepared by subjecting a monomer mixture containing the mono-vinyl aromatic hydrocarbon, the α,β-olefinic unsaturated carboxylic ester, and the α,β-olefinic unsaturated carboxylic acid to emulsion polymerization with the addition of a surface active agent and a polymerization initiator, adding into thus obtained copolymer emulsion at least one chromium compound selected from chromium trioxide, a water-soluble chromate, and a water-soluble bichromate, and maintaining the pH of the system in an alkaline range.

3. The water-dispersed coating composition for metals according to claim 1, wherein said copolymer emulsion further contains at least one member selected from the class consisting of a plasticizer and pigment.

4. The water-dispersed coating composition for metals according to claim 1, wherein said mono-vinyl aromatic hydrocarbon is at least one member selected from the class consisting of styrene and vinyl toluene, said α,β-olefinic unsaturated carboxylic ester is at least one member selected from the class consisting of an ester of acrylic acid and an ester of methacrylic acid, and said α,β-olefinic unsaturated carboxylic acid is at least one member selected from the class consisting or acrylic acid, methacrylic acid, and itaconic acid.

5. The water-dispersed coating composition for metals according to claim 1, wherein said mixture of monomers to prepare the copolymer emulsion contains 50–80 parts by weight of a member selected from the class consisting of styrene and vinyltoluene as the mono-vinyl aromatic hydrocarbon, 10–35 parts by weight of an acrylic alkyl ester as the α,β-olefinic unsaturated carboxylic ester, and 11–15 parts by weight of acrylic acid as the α,β-olefinic unsaturated carboxylic acid.

6. The water-dispersed coating composition for metals according to claim 5, wherein said acrylic alkyl ester contains an alkyl group having 4–12 carbon atoms.

7. The water-dispersed coating composition for metals according to claim 2, wherein said surface active agent is at least one member selected from the class consisting of an anionic surface active agent of the sodium di-alkyl sulfosuccinate series, an anionic surface active agent of the sodium alkylnaphthalene sulfonate series, and a nonionic surface active agent of the polyoxyethylene nonylphenyl ether series.

8. The water-dispersed coating composition for metals according to claim 1, wherein said copolymer emulsion contains chromium trioxide in such proportion that the emulsion contains 0.05–0.2 chromium atom per one carboxyl group of the α,β-olefinic unsaturated carboxylic acid.

9. A process for forming coating embracing crosslinkages between carboxylic groups and chromium atoms, which comprises applying water-dispersed coating composition as claimed in claim 1 on the surface of a metal and curing thus formed coating at temperatures at which said chromium compound diffuses sufficiently into the resin particles of said emulsion to form said crosslinkages.

10. A process for forming coating having crosslinkages between carboxyl groups and chromium atoms, which comprises applying the water-dispersed coating composition as claimed in claim 1 on the surface of a metal and curing thus formed coating for 30 seconds to 15 minutes at temperatures in the range of 150° to 280° C.

11. A coated metallic article having the surface coated by the process as claimed in claim 10.

12. The coated metallic articles according to claim 11, wherein said metal surface coated with the corrosion resisting coating is a member selected from the class consisting of aluminum, zinc, tin, copper, iron and stainless steel.

13. A storage stable aqueous alkaline copolymer emulsion containing at least one chromium compound selected from the group consisting of chromium trioxide, a water-soluble chromate and a water-soluble bichromate, the copolymer being a (mono-vinyl aromatic hydrocarbon)/(α,β-olefinic unsaturated carboxylic ester)/(α,β-olefinic unsaturated carboxylic acid) copolymer wherein the proportion of α,β-olefinic unsaturated carboxylic acid is from 6–20 parts by weight per 100 parts of resinous components in the emulsion, said emulsion containing from 0.05–0.5 chromium atoms per carboxyl group of said carboxylic acid.

14. Metal coated with a cross-linked copolymer, the copolymer being a (mono-vinyl aromatic hydrocarbon)/(α,β-olefinic unsaturated carboxylic ester)/(α,β-olefinic unsaturated carboxylic acid) copolymer, said copolymer containing from 0.05–0.5 chromium atom per carboxyl group of the unsaturated carboxylic acid and from 6–20 parts by weight of said unsaturated carboxylic acid per 100 parts by weight of resinous components, cross-linking being between carboxylic acid groups and chromium atoms.

15. A pigmented metal-coating composition comprising an admixture of pigment and copolymer emulsion, the copolymer emulsion being that of claim 13.

References Cited
UNITED STATES PATENTS

| | | | |
|---|---|---|---|
| 2,902,390 | 9/1959 | Bell | 148—6.2 X |
| 3,036,934 | 5/1962 | Horton et al. | 117—132 |
| 3,057,812 | 10/1962 | Straughan et al. | 117—132 X |
| 3,132,055 | 5/1964 | Tanaka | 148—6.2 X |

RALPH S. KENDALL, *Primary Examiner.*